United States Patent Office 3,305,389

Patented Feb. 21, 1967

3,305,389

PROCESS OF COATING LEAD WITH TIN

Frederick A. Lowenheim, Plainfield, N.J., and Leonard M. Edwards, Ambler, Pa., assignors to M & T Chemicals Inc., New York, N.Y., a corporation of Delaware No Drawing. Filed Nov. 12, 1963, Ser. No. 323,056
16 Claims. (Cl. 117—130)

This invention relates to novel processes for tin plating and to novel plated articles. More specifically this invention relates to novel methods for forming tin plate on a lead basis metal.

Because of its malleability and low melting point, lead has found use as a component of solders, type metals, foil, etc. Lead or high lead alloys may be cast into various decorative or functional articles.

In many instances, it is desirable to plate or coat lead with another metal. For example, it may be desirable to coat lead-containing solder to retard the oxidation or embrittlement which may occur adjacent to the point of soldering. Lead articles may also be coated to improve their appearance, extend their useful life, or otherwise to modify their surface characteristics.

Heretofore, it has been difficult to obtain a satisfactory, adherent metal plate on a lead or high lead alloy basis metal. By the novel process of this invention it may be possible to produce a highly satisfactory tin plate on predominantly lead basis metals. The tin-plated lead articles produced by this process may be used directly or the tin coating may serve as a base for further plating.

It is an object of this invention to provide novel processes for immersion plating tin on predominantly lead basis metals. It is a further object to provide novel tin-coated or tin-plated lead articles. Other objects will become apparent to those skilled-in-the-art upon reading the following description.

In accordance with certain of its aspects, this invention provides a novel process for preparing tin-coated metal articles which comprises immersing a metal article having a surface which is predominantly lead metal in an aqueous solution containing tin ion, hydrogen ion, and 0.05–6 moles per liter of a halide ion having an atomic weight between 35 and 80; said solution being substantially free of corrosive and insolubilizing anions; maintaining said metal article immersed in said solution for a period of time sufficient to form thereon a deposit of tin; and separating the tin-coated metal article from said solution.

The metal articles upon which a tin coating may be formed according to practice of this invention may typically be metal articles having a surface which is predominantly lead metal, i.e., lead per se or alloys containing at least 50% by weight lead. Illustrative metal surfaces may include lead; lead shot (99.8% Pb, 0.2% As); battery plate (94% Pb, 6% Sb); antimonial lead (92–4% Pb, 6–8% Sb); magnolia (90% Pb, 10% Sb); car box metal (84.33% Pb, 14.38% Sb, 0.61% Fe, 0.68% Zn); type metal (82% Pb, 15% Sb, 3% Sn); white metal (75% Pb, 5% Sn, 19% Sb, 1% Cu); type metal (70% Pb, 18% Sb, 10% Sn, 2% Cu); aluminum solder (92% Pb, 8% Cd); chemical lead (99.93% Pb, 0.08% Cu); lead foil (87% Pb, 13% Sn, 1% Cu); marine babbit (72% Pb, 21% Sn, 7% Sb); plumber's solder (67% Pb, 33% Sn); common type metal (57–60% Pb, 10–40% Sn, 4.5–30% Sb); standard type metal (58% Pb, 26% Sn, 15% Sb, 1% Cu); half-and-half solder (50% Pb, 50% Sn); etc. The metal article may be entirely lead metal or lead alloy, or it may comprise a body of another material, typically a metal, on which a surface of lead or lead alloy has been formed.

The solution in which the metal article is immersed may be an aqueous solution containing tin ion. The tin ion may be stannous ($Sn^{+2}$) ion or stannic ($Sn^{+4}$) ion. Preferably, stannous ion may be employed. Typically the aqueous solution may contain at least about 0.05 moles per liter of tin ion, preferably stannous tin ion. Preferably, about 0.05–1.5 moles per liter of tin ion may be employed. Lower amounts may be used, but plating speed may be decreased thereby. Higher concentrations may also be employed, but the appearance of the tin coating obtained may be less satisfactory. The optimum balance of plating speed and appearance may be obtained with a tin ion concentration of about 0.1–0.3 mole per liter.

Tin ion may be introduced into the aqueous solution by dissolving therein a water-soluble tin salt which does not contribute corrosive or insolubilizing anions to the solution, preferably a water-soluble stannous tin salt. A water-soluble tin salt within the context of this invention is a salt capable of producing a tin ion concentration within the above noted ranges under the operating conditions of the process of this invention. Illustrative tin salts which may be employed include stannous chloride, stannous bromide, stannous tartrate, stannous citrate, stannous sulfamate, stannous acetate, stannous gluconate, stannous fluoborate, stannous fluosilicate, stannous p-hydroxybenzoate, stannous perchlorate, stannic chloride, stannous salts of alkylsulfonic acids, etc. The salts may be added as such, or they may be formed in situ, e.g., by dissolving an acid containing the desired anion in the aqueous solution, and adding thereto, e.g., stannous hydroxide or stannous oxide. Preferred salts may include stannous chloride, stannous bromide, stannous sulfamate, stannous fluoborate, stannous perchlorate and stannous fluosilicate; stannous chloride and stannous bromide may be highly preferred. Mixtures of salts may also be employed.

The aqueous acid solution may typically contain hydrogen ion. Typically, the hydrogen ion concentration may be sufficient to prevent hydrolysis of the tin ion to insoluble hydroxides, oxides, and basic salts. It may be found that a hydrogen ion concentration of at least about 0.001 mole per liter may be sufficient. In practice, a hydrogen ion concentration of about 0.03–5 moles per liter may be more preferred. Higher concentrations may cause etching of the metal article. Preferably, the hydrogen ion concentration may be maintained in the range of 0.3–3.0 moles per liter.

The hydrogen ion concentration may typically be controlled by adding a water-soluble acid which does not contribute corrosive or insolubilizing anions to the aqueous solution. A single acid or mixture of acids, capable of producing a hydrogen ion concentration with the above noted ranges may be employed. Typically, the acids which may be employed alone or in combination may include hydrochloric acid, acetic acid, fluoboric acid, hydrobromic acid, sulfamic acid, fluosilicic acid, tartaric aid, p-hydroxybenzoic acid, perchloric acid, etc. Hydrochloric and hydrobromic acids may be preferred, and hydrochloric acid may be highly preferred.

The aqueous acid solution employed in the practice of this invention may also contain halide ion having an atomic weight between 35 and 80, typically chloride or bromide, said halide ion typically being present in the concentration of about 0.05–6 moles/l. Preferably the halide ion may be present in the concentration of 0.3–4 moles/l. and preferably the halide may be chloride The halide ion concentration may typically be maintained in the aqueous acid solution by adding thereto a water-soluble halide compound Water-soluble halide compounds in the context of the invention are those which have sufficient solubility under the operating conditions of this process to produce a halide ion concentration with the above noted limits. Typically, the water-soluble halide compound may be a water-soluble chloride or bromide, including stannous chloride, stannous bromide, hydrochloric acid, hydrobromic acid, stannic chloride, sodium chloride, ammonium bromide, etc. Preferably, the water-soluble halide may be selected from the group consisting of stannous chloride, stannous bromide, hydrochloric acid, and hydrobromic acid. Most preferably, all of the halide ion present in the solution may be derived from the water-soluble stannous tin salt and the acid employed. The most highly preferred solutions may be those wherein all of the tin ion, hydrogen ion and halide ion in the aqueous acid solution may be supplied by the water-soluble tin salt and the acid employed. Examples of such highly preferred solutions include those derived essentially entirely from the following components:

A. Stannous chloride-hydrochloric acid
B. Stannous bromide-hydrobromic acid
C. Stannous hydroxide-hydrochloric acid
D. Stannous hydroxide-hydrobromic acid System A may be most preferred. For example, a highly preferred solution may be prepared by dissolving 0.1–0.3 mole of $SnCl_2$ and 0.3–3.0 moles of HCl in water, and diluting the resultant solution to one liter.

The aqueous acid solution of this invention may preferably be substantially free of corrosive and insolubilizing anions. Corrosive anions are those which attack the surface of the metal article or the tin coating deposited thereon under the operating conditions of the bath, e.g., the trichloroacetate anion. Insolubilizing anions are those which form tin salts having a solubility of less than about 0.05 mole per liter or lead salts having a solubility less than about 0.005 mole per liter under the operating conditions of the process. Such anions include the sulfate, iodide, etc. anions. Preferably, substantially all of the anions present in the solution may be halide anions having an atomic weight between 35 and 80.

Other soluble materials such as wetting agents, levelling agents, brightening agents, etc. may also be present in the aqueous acid solutions if desired.

The metal article having a surface which is predominantly lead metal may be coated with tin by immersing said article in the above-described aqueous acid solution. Typically, the solution may be maintained at a temperature of about 35–100° C. during said immersion and preferably it may be maintained at 50–95° C.

During immersion of the metal article in the aqueous acid solution, lead is removed from the surface of the article as lead ion and tin metal is deposited on the surface of the article. As the plating process proceeds, tin ion is depleted from the solution and lead ion is built up therein. After prolonged operation of the plating process, the efficiency of the bath may decrease until no further plating may occur, i.e. the solution may become inactive. It is a particular feature of the process of this invention that the inactive solution can readily be restored to its original efficiency. Typically, the inactive solution may be cooled from its operating temperature of about 35–100° C. to a lower temperature, typically to about 0–20° C. At this lower temperature, lead ion dissolved in the bath precipitates out as lead halide, e.g. lead chloride or lead bromide and may be separated as by filtration. If desired, additional water-soluble tin salt may be added to restore tin ion removed during plating and additional water-soluble halide compound may be added to replace halide removed as lead halide. Preferably tin halide, e.g. stannous chloride or stannous bromide may be added to supply both tin ion and halide ion. When the solution is again heated to operating temperature, it may be found that its ability to tin plate is restored.

The novel process of this invention may permit attainment of desirably high plating speeds, typically about 2–20 microinches of tin deposited per minute. Moreover, there is little tendency for plating speed to drop off sharply with increasing thickness, and desirably high thicknesses, typically as high as about 150 microinches may be obtained. Deposits having highly satisfactory appearance may be obtained. If desired, the coatings may be reflowed, typically by heating to about 235–240° C. in oil provided the basis metal does not melt at that temperature. Reflowing may be most satisfactorily accomplished when the tin coating is at least about 30 microinches thick. Tin deposits of about 10–150 microinches are typically desirable, and such deposits may be obtained by employing immersion times of about 0.5–45 minutes. Preferably, the tin deposit may be at least 30, say 30–100 microinches and immersion times may be about 1–20 minutes.

Practice of certain specific aspects of this invention may be observed from the following illustrative examples. In all of the examples, 3" x 3" lead panels were used and the thickness of tin deposited was determined by weighing the lead panel before and after immersion. The weight loss of the panel was used to calculate the amount of lead which was replaced by tin. Thickness of the plate on the panel was then determined from the density of tin and the area of the panel. In similar experiments, lead alloy panels, e.g., 50–50 lead-tin, were used and satisfactory plating was also observed.

EXAMPLE 1

A series of solutions was made up containing 50 ml. per liter of 36% hydrochloric acid (.58 mole per liter HCl) and 12.5, 25, 125, and 238 grams per liter of $SnCl_2$ (0.066, 0.132, 0.66 and 1.26 moles per liter of $SnCl_2$, respectively). Lead panels were cleaned and weighed and immersed in the solutions for 5 minutes at 75±3° C. The panels were again cleaned and dried and the thickness of tin deposited was calculated. The results are given in Table I.

*Table I*

| Moles/liter $SnCl_2$: | Thickness deposited (inches $\times 10^{-6}$) |
|---|---|
| 0.066 | 46 |
| 0.132 | 51 |
| 0.66 | 92 |
| 1.26 | 117 |

It may be seen that the plating speeds observed are highly satisfactory. The appearance of the tin deposit from all the baths was satisfactory and that from the bath containing 0.132 moles per liter of $SnCl_2$ was exceptionally good.

EXAMPLE 2

A series of solutions was made up containing 25 grams per liter $SnCl_2$ (0.132 mole per liter) and 2.5, 50, 100 and 250 ml. per liter of 36% hydrochloric acid (0.03, 0.58, 1.17 and 2.92 moles per liter HCl). Lead panels were immersed in each of the solutions for 5 minutes at 75±3° C. and the thickness of tin deposited was calculated. The results are shown in Table II.

*Table II*

| Moles/liter HCl: | Thickness deposited (inches $\times 10^{-6}$) |
|---|---|
| 0.03 | 32 |
| 0.58 | 51 |
| 1.17 | 55 |
| 2.92 | 63 |

Each of the deposits had an exceptionally good appearance.

EXAMPLE 3

A series of solutions was made up containing 25 grams per liter $SnCl_2$ (0.132 mole per liter) and 50 ml. per liter of 36% hydrochloric acid (0.58 mole per liter HCl). Lead panels were plated for 5 minutes in the solution at temperatures of 38° C., 50° C., 65° C., and 90° C. The thickness of tin deposited was calculated. The results are shown in Table III.

*Table III*

| Temperature ° C.: | Thickness deposited (inches $\times 10^{-6}$) |
|---|---|
| 38 | 11 |
| 52 | 22 |
| 65 | 41 |
| 90 | 97 |

Plating speeds observed were satisfactory and those obtained when the temperature was 50–95° C. were particularly good.

Similar experiments to those reported supra were run wherein stannous chloride was replaced by other water-soluble tin salts, e.g., stannic chloride, stannous sulfamate, etc. In other experiments, at least a portion of the hydrochloric acid was replaced by other water-soluble acids, e.g., tartaric acid, acetic acid, citric acid, sulfamic acid, p-hydroxybenzoic acid, etc., and satisfactory results were also obtained.

EXAMPLE 4

100 ml. of plating solution containing 25 grams per liter of $SnCl_2$ (0.132 mole per liter) and 50 ml. per liter of 36% hydrochloric acid (0.58 mole per liter HCl) was made up. A series of 10 cm. x 5 cm. lead panels were consecutively immersed therein for 5 minutes each at a temperature of 70–76° C. The first panel plated had a deposit of excellent appearance with a thickness of about $38\times10^{-6}$ inches. After 18 panels had been plated, the plated thickness after 5 minutes immersion had dropped to $9\times10^{-6}$ inches and the deposit had a grey appearance. The plating solution was cooled to about 19° C. whereupon lead chloride precipitated. The precipitate was filtered off and the filtrate reheated to 70–76° C. It was found that the solution again gave tin deposits of excellent appearance and a deposit thickness of about $30\times10^{-6}$ inches after 5 minutes immersion.

The novel products of this invention may comprise a metal article having a surface which is predominantly lead metal and an immersion tin coating on said surface. These products are unique in that the immersion tin deposit may have excellent appearance and adhesion to the basis lead metal. In addition, surprisingly thick immersion deposits may be obtained. Lead articles having a tin coating of at least 30 microinches are especially preferred because of the improved protection associated therewith and because tin deposits of at least this thickness may be reflowed to produce a bright, smooth coating.

Although this invention has been illustrated by reference to specific examples, numerous changes and modifications thereof which clearly fall within the scope of the invention will be apparent to those skilled in the art.

We claim:

1. The process for preparing tin-coated metal articles which comprises immersing a metal article having a surface which is predominantly lead metal in an aqueous acid solution containing tin ion, hydrogen ion, and 0.05–6 moles per liter of a halide ion having an atomic weight between 35 and 80, said solution being substantially free of corrosive and insolubilizing anions; maintaining said metal article immersed in said solution for a period of time sufficient to form thereon a deposit of tin; and separating the tin-coated metal article from said solution.

2. The process for preparing tin-coated metal articles as claimed in claim 1 wherein substantially all of the anions present in the aqueous acid solution are halide ions having an atomic weight between 35 and 80.

3. The process for preparing tin-coated metal articles which comprises immersing a metal article having a surface which is predominantly lead metal in an aqueous acid solution containing 0.05–1.5 moles per liter of tin ion, 0.03–6 moles per liter of hydrogen ion, and 0.5–6 moles per liter of a halide ion having an atomic weight between 35 and 80, said solution being substantially free of corrosive and insolubilizing anions; maintaining said metal article immersed in said solution for a period of time sufficient to form thereon a deposit of tin; maintaining said solution at a temperature of about 35–100° C. during said immersion; and separating the tin-coated metal article from said solution.

4. The process for preparing tin-coated metal articles as claimed in claim 3 wherein said tin ion is stannous tin ion.

5. The process for preparing tin-coated metal articles as claimed in claim 3 wherein said metal article is a lead article.

6. The process for preparing tin-coated metal articles as claimed in claim 3 wherein said solution is maintained at about 50–95° C.

7. The process for preparing tin-coated metal articles as claimed in claim 3 wherein substantially all of the anions present in the aqueous acid solution are halide ions having an atomic weight between 35 and 80.

8. The process for preparing tin-coated metal articles which comprises immersing a metal article having a surface which is predominantly lead metal in an aqueous acid solution containing 0.1–0.3 mole per liter of stannous tin ion, 0.3–3.0 moles per liter of hydrogen ion, and 0.3–4 moles per liter of halide ion having an atomic weight between 35 and 80, the other anions in said solution consisting essentially of anions selected from the group consisting of sulfamate, fluoborate, perchlorate and fluosilicate; maintaining said metal article immersed in said solution for a period of time sufficient to form thereon a deposit of tin; maintaining said solution at a temperature of about 35–100° C. during said immersion; and separating the tin-coated metal article from said solution.

9. The process for preparing tin-coated metal articles as claimed in claim 8 wherein said metal article is a lead article.

10. The process for preparing tin-coated metal articles as claimed in claim 8 wherein said bath is maintained at about 50–95° C.

11. The process for preparing tin-coated metal articles as claimed in claim 8 wherein substantially all of the anions present in the aqueous acid solution are halide ions having an atomic weight between 35 and 80.

12. The process for preparing tin-coated metal articles which comprises immersing a metal article having a surface which is predominantly lead metal in an aqueous acid solution consisting essentially of 0.1–0.3 mole per liter of stannous chloride and 0.3–3 moles per liter of hydrochloric acid; maintaining said metal article immersed in said solution for 0.5–45 minutes; maintaining said solution at 50–95° C. during said immersion; and separating the tin-coated metal article from said solution.

13. The process for preparing tin-coated metal articles which comprises immersing a metal article having a surface which is predominantly lead metal in an aqueous acid solution consisting essentially of 0.1–0.3 mole per liter of stannous bromide and 0.3–3 moles per liter of hydrobromic acid; maintaining said metal article immersed in said solution for 0.5–45 minutes; maintaining said solution at 50–95° C. during said immersion; and separating the tin-coated metal article from said solution.

14. The process for preparing tin-coated metal articles which comprises maintaining an aqueous acid solution containing 0.05–1.5 moles per liter of stannous tin ion, 0.03–6 moles per liter of hydrogen ion and 0.05–6 moles per liter of a halide ion having an atomic weight between 35 and 80, said solution being substantially free of corrosive and insolubilizing ions; immersing a metal article having a surface which is predominantly lead metal in said aqueous acid solution while maintaining said aqueous acid solution at 35–100° C., thereby depositing tin onto said metal article and dissolving lead in said aqueous acid solution; cooling said aqueous acid solution to 0–20° C., thereby precipitating lead halide; separating said precipitated lead halide from said aqueous acid solution; and reheating said aqueous acid solution to 35–100° C. thereby rendering it suitable for further use.

15. The process for preparing tin-coated metal articles as claimed in claim 14 wherein stannous tin ion is added to said aqueous acid solution prior to said reheating.

16. The process for preparing tin-coated metal articles as claimed in claim 14 wherein stannous chloride is added to said aqueous acid solution prior to said reheating.

References Cited by the Examiner

UNITED STATES PATENTS

| | | | |
|---|---|---|---|
| 1,087,561 | 2/1914 | Tebbetts | 29—194 |
| 1,383,172 | 6/1921 | Sweeney | 29—194 |
| 1,396,051 | 11/1921 | Peacock | 117—130 |
| 2,159,510 | 5/1939 | Pavlish et al. | 117—130 |
| 2,282,511 | 5/1942 | Bradley | 117—130 |
| 2,320,498 | 6/1943 | Wheeler | 29—148.2 |
| 2,551,116 | 5/1951 | Goffard | 29—194 |
| 2,891,871 | 6/1959 | Ceresa | 117—130 |

FOREIGN PATENTS

| | | |
|---|---|---|
| 181,781 | 6/1922 | Great Britain. |
| 552,484 | 4/1943 | Great Britain. |

ALFRED L. LEAVITT, *Primary Examiner.*

RALPH S. KENDALL, *Examiner.*